(12) United States Patent
Chen

(10) Patent No.: US 6,942,371 B2
(45) Date of Patent: Sep. 13, 2005

(54) BACKLIGHT MODULE OF THE LIQUID CRYSTAL DISPLAY WITH ELECTROMAGNETIC MODULE

(75) Inventor: Chih-An Chen, Taipei (TW)

(73) Assignee: Aiptek International Inc., Hsin-Chu (TW)

( * ) Notice: Subject to any disclaimer, the term of this patent is extended or adjusted under 35 U.S.C. 154(b) by 86 days.

(21) Appl. No.: 10/412,327

(22) Filed: Apr. 14, 2003

(65) Prior Publication Data

US 2004/0202009 A1 Oct. 14, 2004

(51) Int. Cl.[7] .................................................. F21V 7/04
(52) U.S. Cl. ...................... 362/561; 362/330; 362/616; 349/58; 348/173
(58) Field of Search .......................... 348/173; 362/561, 362/616, 26, 27, 560, 31, 330; 349/58, 61, 62, 65, 66; 548/173

(56) References Cited

U.S. PATENT DOCUMENTS

| | | | | |
|---|---|---|---|---|
| 5,657,459 | A | * | 8/1997 | Yanagisawa et al. ....... 361/681 |
| 6,264,343 | B1 | * | 7/2001 | Miyashita et al. ............ 362/31 |
| 6,628,352 | B1 | * | 9/2003 | Sumida et al. ................ 349/61 |
| 6,686,979 | B2 | * | 2/2004 | Yoshino ....................... 349/58 |
| 2003/0030762 | A1 | * | 2/2003 | Liu et al. ...................... 349/61 |

* cited by examiner

*Primary Examiner*—John Anthony Ward
(74) *Attorney, Agent, or Firm*—Rosenberg, Klein & Lee

(57) ABSTRACT

This invention discloses a backlight module of a liquid crystal display with an electromagnetic-induction system. The backlight module of the present invention comprises: a lightguide sub-module, a first surface of the lightguide sub-module is coupled with the liquid crystal display; an electromagnetic-induction sub-system, the electromagnetic-induction sub-system is located on a second surface of the lightguide sub-module, the electromagnetic-induction sub-module further comprises an antenna sub-circuit and a control sub-module, wherein the antenna sub-circuit is located under the second surface of the lightguide sub-module, and the control sub-module is coupled with the antenna sub-circuit.

5 Claims, 1 Drawing Sheet

BACKLIGHT MODULE OF THE LIQUID CRYSTAL DISPLAY WITH ELECTROMAGNETIC MODULE

BACKGROUND OF THE INVENTION

1. Field of the Invention

The present invention relates generally to a backlight module of the liquid crystal display, and more particularly, relates a backlight module with the electromagnetic-induction system.

2. Description of the Prior Art

Development of computer is early spring up from the mainframe, its evolutional period goes through personal computer (PC), notebook, personal digital assistant (PDA) and desknote. Recently, the computer industry has developed the era of Tablet PC is defined a PC between PDA and notebook. Tablet PC is presented to the public that means Tablet PC is the evolution of the laptop, that is, Tablet PC is similar to a portable PC with a handwriting recognition system. Tablet PC has various especially functions, such as (digital touch panel and digital pen) (saving files in time), that is different with operation function of past PC. Touch screen of a general Table PC can be turned up or down with 180 degree such that the original shape of the notebook product becomes to a portable handwriting liquid crystal panel for user required. Furthermore, in addition to Tablet PC with all of functions of PC, the best feature in Tablet PC is an electromagnetic-induction module thereof. User can perform the handwriting model with touch pen to input data. This operation will be more close to general function of writing and reading for human. User can input and operate on touch screen by only using touch pen. Accordingly, we can offer the best input model in different environments for user. Moreover, Table PC can offer more natural input method to the user that is not familiar with operation of PC by an interface of handwriting, so as to substitute for traditional input method used keyboard, and to reduce barrier of learning PC.

Because a handwriting recognition system could replace the mouse, and is more suitable than the mouse to let the user input words and patterns by user's hands, improvement of the handwriting recognition system is a hot and important field of current computer technology. The original intention of the handwriting recognition system, there are a electromagnetic-induction system, and the conventional electromagnetic-induction systems with a electromagnetic pen and a digital tablet. There is an oscillating circuit that consists of LC in the electromagnetic pen. If the pen point is touched, the amount of inductance will be changed that results in the variation of oscillating frequency. The amount of inductance is increased when touching the pen point and increasing pressure so the variation of oscillating frequency is also increased. Therefore, the variation of the pressure on the pen point can be detected by way of the variation of oscillating frequency. There are two switches on the sidewall of the electromagnetic pen, the emitted frequency of the electromagnetic pen can be changed with the capacitance variation of the LC device that is produced by pushing down or setting free the switches. Furthermore, the tablet comprises a detector, an amplifier and an analog-digital converter. In the conventional tablet, there is a detected loop in the center region of the tablet, with one-way antennas located on the double faces of the detected loop, wherein the one-way antennas are equidistantly arranged in order by way of using array. The main purpose of the one-way detected loop is only applied to receive the electromagnetic wave that is emitted by the electromagnetic pen. When the electromagnetic pen emits the electromagnetic wave, the one-way antennas receive the electromagnetic wave, and then the tablet can obtain correlative information by the electromagnetic induction.

Nowadays Table PC just utilizes foregoing electromagnetic-induction system so as to enable to handwriting input. Usually there are two organized structures in general Table PC, one is a liquid crystal display with a backlight module, and the other is the electromagnetic-induction system with antenna circuit. However, regarding advanced technology industry, product shrink is one of important milestone of development.

In view of foregoing, how to harmonize about a liquid crystal display with a backlight module and the electromagnetic-induction system with antenna circuit so as to shrink the size and thickness of product, reduce process cost, and enhance penetration efficiency of electromagnetic-induction, those are important subjects.

SUMMARY OF THE INVENTION

In accordance with the above description of the skills in prior art, the present invention provides a backlight module of the liquid crystal display with the electromagnetic-induction system to aggrandize conventional penetrative efficiency of the electromagnetic-induction, shrink of the size and thickness of product, reduce process cost, and enhance the yield of product, so as to improve the objects that can not be achieved by conventional Table PC.

One object of the present invention is to provide a backlight module with the electromagnetic-induction system of the liquid crystal display. In the present invention, the electromagnetic-induction system is designed in the backlight module to shrink the size and thickness of product such that the process can be simplified, the production cost can also be reduced and penetrative efficiency of the electromagnetic-induction is enhanced, whereby the present invention can shrink the space of the backlight module and the area of the liquid crystal display. Therefore, the present invention can satisfies the economical efficiency and industrial utility.

In accordance with the above description, this invention discloses a backlight module with an electromagnetic-induction system of a liquid crystal display. The backlight module of the present invention comprises: a lightguide sub-module, a first surface of the lightguide sub-module is coupled with the liquid crystal display; an electromagnetic-induction sub-system, the electromagnetic-induction sub-system is located on a second surface of the lightguide sub-module; the electromagnetic-induction sub-module further comprises an antenna sub-circuit and a control sub-module, wherein the antenna sub-circuit is located under the second surface of the lightguide sub-module, and the control sub-module is coupled with the antenna sub-circuit.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DESCRIPTION OF THE PREFERRED EMBODIMENT

What is probed into in the invention is a backlight module of a liquid crystal display. Detailed steps in production, structure and elements will be provided in the following description in order to make the invention thoroughly understood. Obviously, the application of the invention is not confined to specific details familiar to those who are skilled in a liquid crystal display or an electromagnetic-induction system. On the other hand, the common elements and procedures that are known to everyone are not described in the details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1:
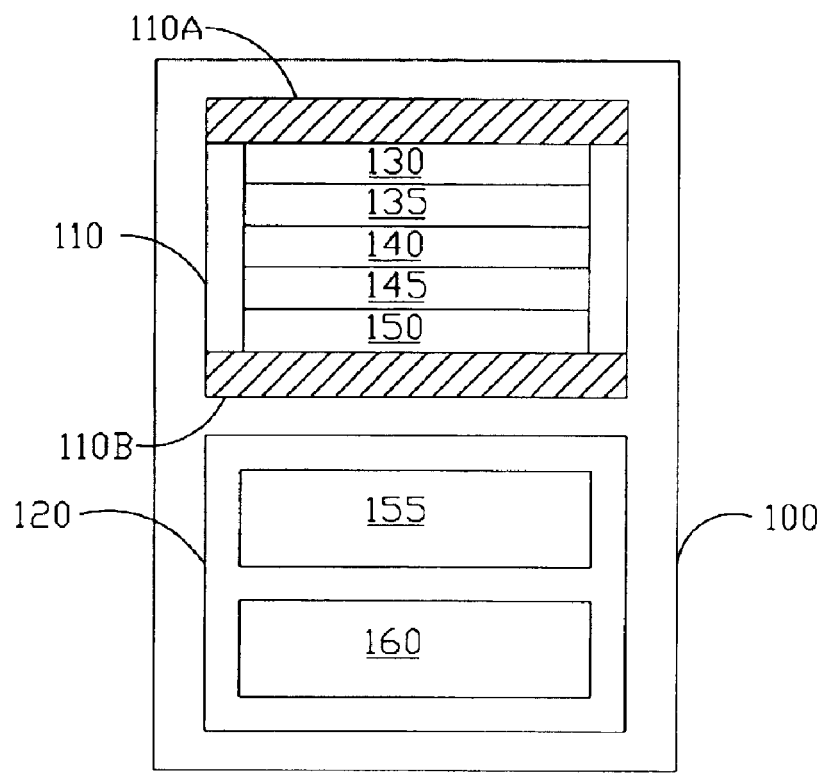
FIG. 1 shows cross-sectional views illustrative of the backlight module with the electromagnetic-induction sub-module in accordance with the first of the preferred embodiment.

As illustrated in FIG. 1, in the first preferred embodiment of the present invention, this invention provides a backlight module 100 of a liquid crystal display, the backlight module 100 comprises: a lightguide sub-module 110 and an electromagnetic-induction sub-module 120, wherein a first surface 110A of the lightguide sub-module 110 is located under the non-visible side of the liquid crystal display (not shown in FIG. 1), and the electromagnetic-induction sub-module 120 is located under a second surface 110B of the lightguide sub-module 110 to combine in the backlight module 100. Furthermore, the lightguide sub-module 110 comprises: an upper diffusion film 130, the upper diffusion film 130 is located under the first surface 110A of the lightguide sub-module 110; an enhancement brightness film 135, the enhancement brightness film 135 is located under the upper diffusion film 130; a below diffusion film 140, the below diffusion film 140 is located under the enhancement brightness film 135; a lightguide film 145, the lightguide film 145 is located under the below diffusion film 140; a reflection film 150, the reflection film 150 is located under the lightguide film 145. Moreover, the electromagnetic-induction sub-module 120 further comprises an antenna sub-circuit 155 and a control sub-circuit 160, wherein this present embodiment can also excludes the control sub-circuit 160 from the structure of the backlight module 100.

Figure 2:
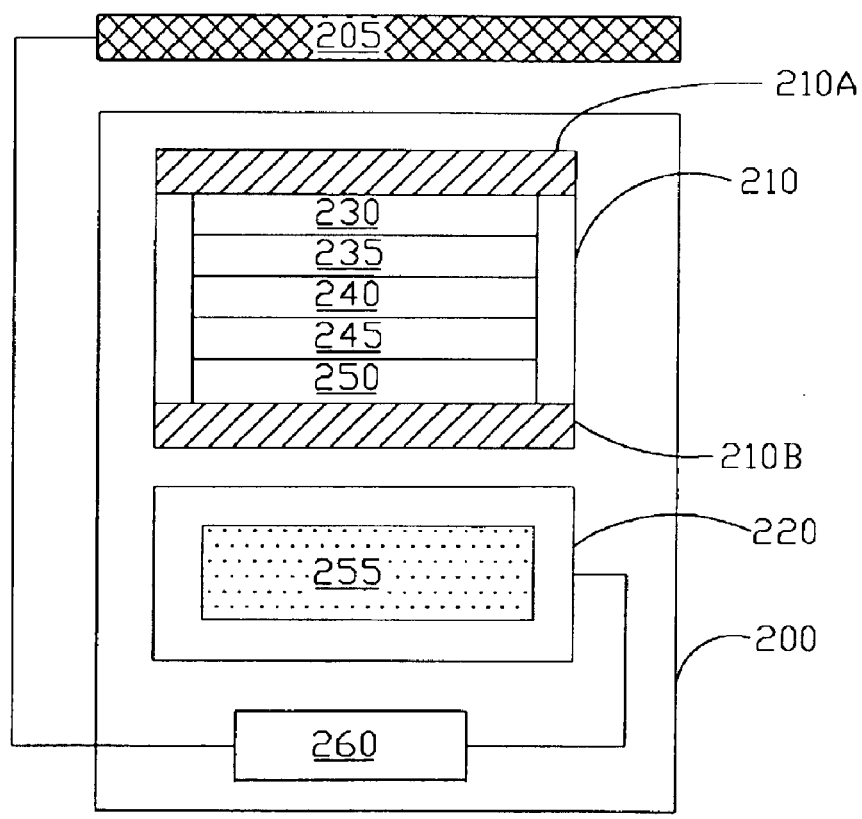
FIG. 2 shows cross-sectional views illustrative of the backlight module with the electromagnetic-induction sub-module structure in accordance with the second of one of the preferred embodiment.

As illustrated in FIG. 2, in the second preferred embodiment of the present invention, this invention provides a backlight module 200 of a liquid crystal display and a display module 205, the display module 205 comprises a liquid crystal display apparatus and a drive sub-circuit thereof. The backlight module 200 comprises: a lightguide sub-module 210, an electromagnetic-induction sub-module 220 and a control sub-module 260, wherein a first surface 210A of the lightguide sub-module 210 is located under the display module 205, and the electromagnetic-induction sub-module 220 is located under a second surface 210B of the lightguide sub-module 210 to combine in the backlight module 200, and the electromagnetic-induction sub-module 220 includes an antenna sub-circuit 255. Furthermore, the lightguide sub-module 210 further comprises: an upper diffusion film 230, the upper diffusion film 230 is located under the first surface 210A of the lightguide sub-module 210; an enhancement brightness film 235, the enhancement brightness film 235 is located under the upper diffusion film 230; a below diffusion film 240, the below diffusion film 240 is located under the enhancement brightness film 235; a lightguide film 245, the lightguide film 245 is located under the below diffusion film 240; a reflection film 250, the reflection film 250 is located under the lightguide film 245. On the other hand, a control sub-module 260 is individually coupled with the display module 205 and the electromagnetic-induction sub-module 220 to control both 205/220 operation; and further, the control sub-module 260 is coupled with the antenna sub-circuit 255 of the electromagnetic-induction sub-module 220, wherein this present embodiment can also excludes the control sub-circuit 260 from the structure of the backlight module 200.

In this embodiment of the present invention, as discussed above, this invention combines the electromagnetic-induction system in the backlight module to shrink the size and thickness of product, so as to simplify the process for reducing production cost and enhance penetrative efficiency of electromagnetic-induction, whereby the present invention can shrink the space of the backlight module and the area of the liquid crystal display. Therefore, this invention satisfies the economical efficiency and industrial utility. Of course, it is possible to apply the present invention in the backlight module of the liquid crystal display, and to any display apparatus with the electromagnetic-induction system. Also, this invention utilizes that the electromagnetic-induction system combined in the backlight module to conform to the requirement for shrinking the size and thickness of product has not been developed concerning the electromagnetic-induction device at present.

Although a specific embodiment has been illustrated and described, it will be obvious to those skilled in the art that various modifications may be made without departing from what is intended to be limited solely by the appended claims. Obviously, many modifications and variations of the present invention are possible in light of the above teachings. It is therefore to be understood that within the scope of the appended claims, the present invention may be practiced otherwise than as specifically described herein.

What is claimed is:

1. A backlight module of the liquid crystal display, said backlight module of the liquid crystal display comprising:
   a lightguide sub-module, a first surface of said lightguide sub-module is located under an invisible side of the liquid crystal display, said lightguide sub-module comprising:
      an upper diffusion film located under said first surface of said lightguide sub-module; an enhancement brightness film located under said upper diffusion film;
      a below diffusion film located under said enhancement brightness film;
      a ligthguide film under said below diffusion film; and
      a reflection film located under said lightguide film;
   an electromagnetic-induction sub-module, said electromagnetic-induction sub-module is located under a second surface of said lightguide sub-module to combine in said backlight module.

2. The backlight module of the liquid crystal display according to claim 1, wherein said electromagnetic-induction sub-module comprises a control sub-circuit.

3. A backlight module, wherein a display module and said backlight module are utilized in a liquid crystal display apparatus, said backlight module comprising
   a lightguide sub-module, wherein a first surface of said lightguide sub-module is located under an invisible side of the liquid crystal display, said lightguide sub-module comprising:
- an upper diffusion film located under said first surface of said lightguide sub-module;
- an enhancement brightness film located under said upper diffusion film;
- a below diffusion film located under said enhancement brightness film;
- a lightguide film located under said below diffusion film; and
- a reflection film located under said lightguide film;

an electromagnetic-induction sub-module located under a second surface of said lightguide sub-module to combine in said backlight module; and a control sub-module, said control sub-module is individually coupled with said display module and said electromagnetic-induction sub-module to control the operation of said display module and said electromagnetic-induction sub-module.

4. The backlight module of the liquid crystal display according to claim 3, wherein said electromagnetic-induction sub-module comprises an antenna sub-circuit, said antenna sub-circuit is coupled with said control sub-module.

5. A backlight module of the liquid crystal display, said backlight module of the liquid crystal display comprising:
- a lightguide sub-module, a first surface of said lightguide sub-module is located under an invisible side of the liquid crystal display; and
- an electromagnetic-induction sub-module comprising an antenna sub-circuit, said electromagnetic-induction sub-module is located under a second surface of said lightguide sub-module to combine in said backlight module.

* * * * *